US008163132B2

(12) United States Patent  
Kien

(10) Patent No.: US 8,163,132 B2  
(45) Date of Patent: *Apr. 24, 2012

(54) ABSORBENT PAPER PRODUCT HAVING PRINTED INDICIA WITH A WIDE COLOR PALETTE

(75) Inventor: Kathryn Christian Kien, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,681

(22) Filed: Sep. 20, 2011

(65) Prior Publication Data

US 2012/0009397 A1    Jan. 12, 2012

Related U.S. Application Data

(62) Division of application No. 12/250,088, filed on Oct. 13, 2008, now Pat. No. 8,066,848.

(60) Provisional application No. 61/001,775, filed on Nov. 2, 2007.

(51) Int. Cl.  
*B44F 1/08*    (2006.01)

(52) U.S. Cl. ............... 162/134; 162/135; 428/195.1; 428/211.1

(58) Field of Classification Search ........... 162/123, 162/132–137, 161; 428/195.1, 211.1; 101/32, 101/137–138, 175–178; 106/31.13  
See application file for complete search history.

(56) References Cited

U.S. PATENT DOCUMENTS 4,812,899 A    3/1989 Kueppers  
(Continued)

FOREIGN PATENT DOCUMENTS

GB    2 281 534 A    3/1995  
(Continued)

*Primary Examiner* — Jose A Fortuna  
(74) *Attorney, Agent, or Firm* — Peter D. Meyer

(57) ABSTRACT

An absorbent paper product is disclosed. The absorbent paper product has an MD modulus of less than about 20,000 g/cm at a load of about 15 g. The absorbent paper product further has indicia provided by five or more process colors. The process colors have $L^*a^*b^*$ color values. The $a^*$ and $b^*$ values are outside the boundary described by the following system of equations:

$\{a^*=-29.0 \text{ to } -5.2; b^*=14.0 \text{ to } 49.5\} \rightarrow b^*=1.4916a^*+57.2563$ $\{a^*=-5.2 \text{ to } 35.3; b^*=49.5 \text{ to } 38.9\} \rightarrow b^*=-0.261728a^*+48.139$ $\{a^*=35.3 \text{ to } 38.3; b^*=5.3 \text{ to } 38.9\} \rightarrow b^*=-11.2a^*+434.26$ $\{a^*=38.3 \text{ to } 36.3; b^*=5.3 \text{ to } -0.70\} \rightarrow b^*=3a^*-109.6$ $\{a^*=36.3 \text{ to } 11.3; b^*=-0.70 \text{ to } -26.0\} \rightarrow b^*=1.012a^*-37.4356$ $\{a^*=11.3 \text{ to } -20.0; b^*=-26.0 \text{ to } -29.3\} \rightarrow b^*=-0.105431a^*-27.1914$ $\{a^*=-20.0 \text{ to } -29.0; b^*=-29.3 \text{ to } 14.0\} \rightarrow b^*=-4.81111a^*-125.522$ wherein $L^*$ is from 0 to 100.

14 Claims, 3 Drawing Sheets

U.S. PATENT DOCUMENTS

| | | |
|---|---|---|
| 4,841,903 A | 6/1989 | Bird |
| 4,844,952 A | 7/1989 | Korenkiewicz et al. |
| 4,878,977 A | 11/1989 | Kueppers |
| 5,123,343 A | 6/1992 | Willer |
| 5,209,953 A | 5/1993 | Grupe et al. |
| 5,309,246 A | 5/1994 | Barry et al. |
| 5,339,730 A | 8/1994 | Ruppel et al. |
| 5,385,091 A | 1/1995 | Cuir et al. |
| 5,458,590 A | 10/1995 | Schleinz et al. |
| 5,486,500 A | 1/1996 | Kaufman |
| 5,490,457 A | 2/1996 | Boulanger et al. |
| 5,520,112 A | 5/1996 | Schleinz et al. |
| 5,612,118 A | 3/1997 | Schleinz et al. |
| 5,638,752 A | 6/1997 | Hartung et al. |
| 5,892,891 A | 4/1999 | Dalal et al. |
| 6,026,748 A | 2/2000 | Reed et al. |
| 6,053,107 A | 4/2000 | Hertel et al. |
| 6,096,412 A | 8/2000 | McFarland et al. |
| 6,165,319 A | 12/2000 | Heath et al. |
| 6,459,501 B1 | 10/2002 | Holmes |
| 6,610,131 B2 | 8/2003 | Harris et al. |
| 7,037,575 B2 | 5/2006 | Forry et al. |
| 7,054,031 B2 | 5/2006 | Lee et al. |
| 7,351,308 B2 | 4/2008 | Urlaub et al. |
| 8,066,848 B2 * | 11/2011 | Kien .............................. 162/134 |
| 2003/0007164 A1 | 1/2003 | Lee et al. |
| 2003/0044578 A1 | 3/2003 | Nissing |
| 2003/0187798 A1 | 10/2003 | McKinley et al. |
| 2004/0058130 A1 | 3/2004 | Nissing |
| 2005/0131103 A1 | 6/2005 | Hassan et al. |
| 2005/0231576 A1 | 10/2005 | Lee et al. |
| 2006/0082844 A1 | 4/2006 | White |
| 2007/0081175 A1 | 4/2007 | Grier |
| 2008/0202964 A1 | 8/2008 | Knobloch et al. |
| 2009/0114354 A1 | 5/2009 | Kien |
| 2010/0092743 A1 * | 4/2010 | Warner et al. .............. 428/211.1 |
| 2010/0136295 A1 | 6/2010 | Grier |
| 2012/0009397 A1 * | 1/2012 | Kien .......................... 428/195.1 |

FOREIGN PATENT DOCUMENTS

| | | | |
|---|---|---|---|
| GB | 2 410 215 A | 7/2005 | |
| WO | WO 99/54143 | 10/1999 | |

* cited by examiner

ABSORBENT PAPER PRODUCT HAVING PRINTED INDICIA WITH A WIDE COLOR PALETTE

CROSS-REFERENCE TO RELATION APPLICATION

This application is a divisional of U.S. application Ser. No. 12/250,088, filed Oct. 13, 2008 now U.S. Pat. No. 8,066,848, which claims the benefit of provisional U.S. Application No. 61/001,775, filed Nov. 2, 2007.

FIELD OF THE INVENTION

This invention pertains to an absorbent paper product having images and/or indicia printed thereon, wherein the printed images are produced by a relatively high number of process colors and/or spot colors.

BACKGROUND OF THE INVENTION

Absorbent paper products are a staple of everyday life. Absorbent paper products are used as consumer products for paper towels, toilet tissue, facial tissue, napkins, and the like. The large demand for such paper products has created a demand for improved aesthetics, visual effects, and other benefits on the surface of the product, and as a result, improved methods of creating these visual effects.

Many consumers prefer absorbent paper products that have a design, or other artwork, printed thereon. For example, during specific holidays, consumers sometimes choose a paper towel product that compliments that holiday.

In the art of absorbent paper products, printed indicia may be provided onto the substrate surfaces using process printing processes which often offer an overall positive consumer response. However, typical prior art process printing methodology and apparatus for absorbent paper products is often limited to having four colors as the basis for generating the resulting color palette. The prior art process printing allows producers and manufacturers with the benefit of absorbent paper products with the ability to print on absorbent paper product substrates at a speed that is commercially viable. Those of skill in the art will appreciate that the substrates used for many absorbent paper products, especially through air dried and other formed substrates, have properties such as a relatively low modulus, a highly textured surface, and other physical properties that make such a substrate difficult to print on using conventional high-speed printing processes/apparatus. While practical, the prior art processes for printing on absorbent paper product substrates are held to a four color base for printing, and, as a result, are unable to capture as wide of a color palette as a process/apparatus that takes advantage of a larger number of base colors. Without wishing to be limited by theory, it is thought that providing an absorbent paper product with a color palette that exceeds the prior art color palette (i.e., a product having more vibrant, intricate, or bright printed pattern thereon) will delight the consumer.

Accordingly, it is desired to provide a printing process and apparatus for providing an absorbent paper product that has a relatively wide color palette.

SUMMARY OF THE INVENTION

Figure 1A:
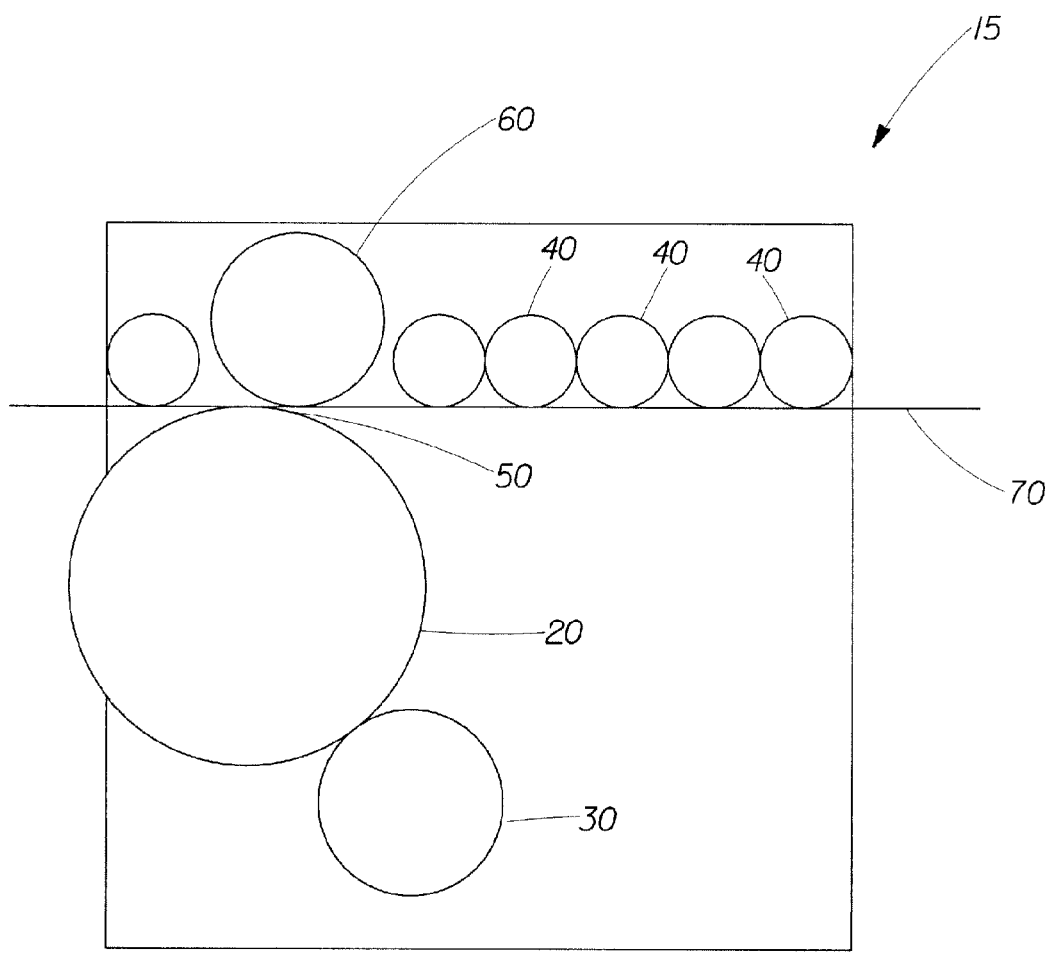
FIG. 1A shows a schematic view of an exemplary embodiment of a single printing station.

The present disclosure provides for an absorbent paper product. The absorbent paper product has an MD modulus of less than about 20,000 g/cm at a load of about 15 g. The absorbent paper product further has indicia provided by five or more process colors. The process colors have L*a*b* color values. The a* and b* values are outside the boundary described by the following system of equations:

$\{a^* = -29.0 \text{ to } -5.2; b^* = 14.0 \text{ to } 49.5\} \rightarrow b^* = 1.4916a^* + 57.2563$ $\{a^* = -5.2 \text{ to } 35.3; b^* = 49.5 \text{ to } 38.9\} \rightarrow b^* = -0.261728a^* + 48.139$ $\{a^* = 35.3 \text{ to } 38.3; b^* = 5.3 \text{ to } 38.9\} \rightarrow b^* = -11.2a^* + 434.26$ $\{a^* = 38.3 \text{ to } 36.3; b^* = 5.3 \text{ to } -0.70\} \rightarrow b^* = 3a^* - 109.6$ $\{a^* = 36.3 \text{ to } 11.3; b^* = -0.70 \text{ to } -26.0\} \rightarrow b^* = 1.012a^* - 37.4356$ $\{a^* = 11.3 \text{ to } -20.0; b^* = -26.0 \text{ to } -29.3\} \rightarrow b^* = 0.105431a^* - 27.1914$ $\{a^* = -20.0 \text{ to } -29.0; b^* = -29.3 \text{ to } 14.0\} \rightarrow b^* = -4.81111a^* - 125.522$ wherein L* is from 0 to 100.

DETAILED DESCRIPTION OF THE INVENTION

"Paper product," as used herein, refers to any formed, fibrous structure products, traditionally, but not necessarily, comprising cellulose fibers. In one embodiment, the paper products of the present invention include tissue-towel paper products.

"Absorbent paper product," as used herein, refers to products comprising paper tissue or paper towel technology in general, including, but not limited to, conventional felt-pressed or conventional wet-pressed fibrous structure product, pattern densified fibrous structure product, starch substrates, and high bulk, uncompacted fibrous structure product. Non-limiting examples of tissue-towel paper products include disposable or reusable, toweling, facial tissue, bath tissue, and the like. In one non-limiting embodiment, the absorbent paper product is directed to a paper towel product. In another non-limiting embodiment, the absorbent paper product is directed to a rolled paper towel product. One of skill in the art will appreciate that in one embodiment an absorbent paper product may have CD and/or MD modulus properties and/or stretch properties that are different from other printable substrates, such as card paper. Such properties may have important implications regarding the absorbency and/or roll-ability of the product. Such properties are described in greater detail infra.

"Ply" or "plies," as used herein, means an individual fibrous structure, sheet of fibrous structure, or sheet of an absorbent paper product optionally to be disposed in a substantially contiguous, face-to-face relationship with other plies, forming a multi-ply fibrous structure. It is also contemplated that a single fibrous structure can effectively form two "plies" or multiple "plies", for example, by being folded on itself. In one embodiment, the ply has an end use as a tissue-towel paper product. A ply may comprise one or more wet-laid layers, air-laid layers, and/or combinations thereof. If more than one layer is used, it is not necessary for each layer to be made from the same fibrous structure.

Further, the layers may or may not be homogenous within a layer. The actual makeup of a fibrous structure product ply is generally determined by the desired benefits of the final tissue-towel paper product, as would be known to one of skill in the art. The fibrous structure may comprise one or more plies of non-woven materials in addition to the wet-laid and/or air-laid plies.

"Fibrous structure," as used herein, means an arrangement of fibers produced in any papermaking machine known in the art to create a ply of paper product or absorbent paper product. "Fiber" means an elongate particulate having an apparent length greatly exceeding its apparent width. More specifically, and as used herein, fiber refers to such fibers suitable for a papermaking process. The present invention contemplates the use of a variety of paper making fibers, such as, natural fibers, synthetic fibers, as well as any other suitable fibers, starches, and combinations thereof. Paper making fibers useful in the present invention include cellulosic fibers commonly known as wood pulp fibers. Applicable wood pulps include chemical pulps, such as Kraft, sulfite and sulfate pulps; mechanical pulps including groundwood, thermomechanical pulp, chemithetmomechanical pulp; chemically modified pulps, and the like. Chemical pulps, however, may be preferred in tissue towel embodiments since they are known to those of skill in the art to impart a superior tactical sense of softness to tissue sheets made therefrom. Pulps derived from deciduous trees (hardwood) and/or coniferous trees (softwood) can be utilized herein. Such hardwood and softwood fibers can be blended or deposited in layers to provide a stratified web. Exemplary layering embodiments and processes of layering are disclosed in U.S. Pat. Nos. 3,994,771 and 4,300,981. Additionally, fibers derived from non-wood pulp such as cotton linters, bagesse, and the like, can be used. Additionally, fibers derived from recycled paper, which may contain any or all of the pulp categories listed above, as well as other non-fibrous materials such as fillers and adhesives used to manufacture the original paper product may be used in the present web. In addition, fibers and/or filaments made from polymers, specifically hydroxyl polymers, may be used in the present invention. Non-limiting examples of suitable hydroxyl polymers include polyvinyl alcohol, starch, starch derivatives, chitosan, chitosan derivatives, cellulose derivatives, gums, arabinans, galactans, and combinations thereof. Additionally, other synthetic fibers such as rayon, lyocel, polyester, polyethylene, and polypropylene fibers can be used within the scope of the present invention. Further, such fibers may be latex bonded. Other materials are also intended to be within the scope of the present invention as long as they do not interfere or counter act any advantage presented by the instant invention.

"Process Printing," as used herein, refers to the method of providing color prints using three primary colors cyan, magenta, yellow and black. Each layer of color is added over a base substrate. In some embodiments, the base substrate is white or off-white in color. With the addition of each layer of color, certain amounts of light are absorbed (those of skill in the printing arts will understand that the inks actually "subtract" from the brightness of the white background), resulting in various colors. CMY (cyan, magenta, yellow) are used in combination to provide additional colors. Non-limiting examples of such colors are red, green, and blue. K (black) is used to provide alternate shades and pigments. One of skill in the art will appreciate that CMY may alternatively be used in combination to provide a black-type color.

"Halftoning," as used herein, sometimes known to those of skill in the printing arts as "screening," is a printing technique that allows for less-than-full saturation of the primary colors. In halftoning, relatively small dots of each primary color are printed in a pattern small enough such that the average human observer perceives a single color. For example, magenta printed with a 20% halftone will appear to the average observer as the color pink. The reason for this is because, without wishing to be limited by theory, the average observer may perceive the tiny magenta dots and white paper between the dots as lighter, and less saturated, than the color of pure magenta ink.

"Base Color," as used herein, refers to a color that is used in the halftoning printing process as the foundation for creating additional colors. In some nonlimiting embodiments, a base color is provided by a colored ink and/or dye. Nonlimiting examples of base colors may selected from the group consisting of: cyan, magenta, yellow, black, red, green, and blue-violet.

"Resultant Color," as used herein, refers to the color that an ordinary observer perceives on the finished product of a halftone printing process. As exemplified supra, the resultant color of magenta printed at a 20% halftone is pink.

"Lab Color" or "L*a*b* Color Space," as used herein, refers to a color model that is used by those of skill in the art to characterize and quantitatively describe perceived colors with a relatively high level of precision. More specifically, CIELab may be used to illustrate a gamut of color because L*a*b* color space has a relatively high degree of perceptual uniformity between colors. As a result, L*a*b* color space may be used to describe the gamut of colors that an ordinary observer may actually perceive visually.

A color's identification is determined according to the Commission Internationale de l'Eclairage L*a*b* Color Space (hereinafter "CIELab"). CIELab is a mathematical color scale based on the Commission Internationale de l'Eclairage (hereinafter "CIE") 1976 standard. CIELab allows a color to be plotted in a three-dimensional space analogous to the Cartesian xyz space. Any color may be plotted in CIELab according to the three values (L*, a*, b*). For example, there is an origin with two axis a* and b* that are coplanar and perpendicular, as well as an L-axis which is perpendicular to the a* and b* axes, and intersects those axes only at the origin. A negative a* value represents green and a positive a* value represents red. CIELab has the colors blue-violet to yellow on what is traditionally the y-axis in Cartesian xyz space. CIELab identifies this axis as the b*-axis. Negative b* values represent blue-violet and positive b* values represent yellow. CIELab has lightness on what is traditionally the z-axis in Cartesian xyz space. CIELab identifies this axis as the L-axis. The L*-axis ranges in value from 100, which is white, to 0, which is black. An L* value of 50 represents a mid-tone gray (provided that a* and b* are 0). Any color may be plotted in CIELab according to the three values (L*, a*, b*). As described supra, equal distances in CIELab space correspond to approximately uniform changes in perceived color. As a result, one of skill in the art is able to approximate perceptual differences between any two colors by treating each color as a different point in a three dimensional, Euclidian, coordinate system, and calculating the Euclidian distance between the two points ($\Delta E^*_{ab}$).

The three dimensional CIELab allows the three color components of chroma, hue, and lightness to be calculated. Within the two-dimensional space formed from the a-axis and b-axis, the components of hue and chroma can be determined Chroma is the relative saturation of the perceived color and is determined by the distance from the origin as measured in the a*b* plane. Chroma, for a particular (a*, b*) set is calculated according to Formula 1 as follows:

$$C^* = (a^{*2} + b^{*2})^{1/2}$$ Formula 1

For example, a color with a*b* values of (10,0) would exhibit a lesser chroma than a color with a*b* values of (20,0). The latter color would be perceived qualitatively as being more red than the former. Hue is the relative red, yellow, green, and blue-violet in a particular color. A ray can be created from the origin to any color within the two-dimensional a*b* space. Hue is the angle measured from 0° (the positive a* axis) to the created ray. Hue can be any value of between 0° to 360°. Lightness is determined from the L* value with higher values being more white and lower values being more black.

"Red", as used herein, refers to a color and/or base color which has a local maximum reflectance in the spectral region of from about 621 nm to about 740 nm.

"Green", as used herein, refers to a color and/or base color which have a local maximum reflectance in the spectral region of from about 491 nm to about 570 nm.

"Blue" or "Blue-violet", as used herein, refers to a color and/or base color which have a local maximum reflectance in the spectral region of from about 390 nm to about 490 nm.

"Cyan", as used herein, refers to a color and/or base color which have a local maximum reflectance in the spectral region of from about 390 nm to about 570 nm. In some embodiments, the local maximum reflectance is between the local maximum reflectance of the blue or blue-violet and green local maxima.

"Magenta", as used herein, refers to a color and/or base color which have a local maximum reflectance in the spectral region of from about 390 nm to about 490 nm and 621 nm to about 740 nm.

"Yellow", as used herein, refers to a color and/or base color which have a local maximum reflectance in the spectral region of from about 571 nm to about 620 nm.

"Black", as used herein, refers to a color and/or base color which absorbs wavelengths in the entire spectral region of from about 380 nm to about 740 nm.

"Basis Weight", as used herein, is the weight per unit area of a sample reported in lbs/3000 ft² or g/m².

"Modulus", as used herein, is a stress-strain measurement which describes the amount of force required to deform a material at a given point.

"Machine Direction" or "MD", as used herein, means the direction parallel to the flow of the fibrous structure through the papermaking machine and/or product manufacturing equipment.

"Cross Machine Direction" or "CD", as used herein, means the direction perpendicular to the machine direction in the same plane of the fibrous structure and/or fibrous structure product comprising the fibrous structure.

In one embodiment, the absorbent paper product substrate may be manufactured via a wet-laid paper making process. In other embodiments, the absorbent paper product substrate may be manufactured via a through-air-dried paper making process or foreshortened by creping or by wet microcontraction. In some embodiments, the resultant paper product plies may be differential density fibrous structure plies, wet laid fibrous structure plies, air laid fibrous structure plies, conventional fibrous structure plies, and combinations thereof. Creping and/or wet microcontraction are disclosed in U.S. Pat. Nos. 6,048,938, 5,942,085, 5,865,950, 4,440,597, 4,191,756, and 6,187,138.

In an embodiment, the absorbent paper product may have a texture imparted into the surface thereof wherein the texture is formed into product during the wet-end of the papermaking process using a patterned papermaking belt. Exemplary processes for making a so-called pattern densified absorbent paper product include, but are not limited, to those processes disclosed in U.S. Pat. Nos. 3,301,746, 3,974,025, 4,191,609, 4,637,859, 3,301,746, 3,821,068, 3,974,025, 3,573,164, 3,473,576, 4,239,065, and 4,528,239.

In other embodiments, the absorbent paper product may be made using a through-air-dried (TAD) substrate. Examples of, processes to make, and/or apparatus for making through air dried paper are described in U.S. Pat. Nos. 4,529,480, 4,529,480, 4,637,859, 5,364,504, 5,529,664, 5,679,222, 5,714,041, 5,906,710, 5,429,686, and 5,672,248.

In other embodiments still, the absorbent paper product substrate may be conventionally dried with a texture as is described in U.S. Pat. Nos. 5,549,790, 5,556,509, 5,580,423, 5,609,725, 5,629,052, 5,637,194, 5,674,663, 5,693,187, 5,709,775, 5,776,307, 5,795,440, 5,814,190, 5,817,377, 5,846,379, 5,855,739, 5,861,082, 5,871,887, 5,897,745, and 5,904,811.

Absorbent Paper Products: Printing

As described supra, those of skill in the art will appreciate the especially surprising color palette of the present invention absorbent paper products because those of skill in the art will appreciate that absorbent paper product substrates are relatively difficult to print on. Without wishing to be limited by theory, it is thought that because many absorbent paper product substrates are textured, a relatively high level of pressure must be used to transfer ink to the spaces on the surface of the absorbent paper product substrate. In addition, absorbent paper product substrates tend to have a higher amount of dust that is generated during a printing process, which may cause contamination at high speeds using ordinary printing equipment. Further, because an absorbent paper product substrate tends to be more absorbent than an ordinary printable substrate, there may be a relatively high level of dot gain (the spread of the ink from its initial/intended point of printing to surrounding areas). Those of skill in the art will appreciate that a typical piece of paper that may be used for printing a book will have a dot gain of about 3% to about 4% whereas an absorbent paper product may have a dot gain as high as about 20%. As a result, absorbent paper product substrates are typically unable to have balance low intensity and high intensity printing. One of skill in the art will appreciate that low-intensity colors often serve as the basis for other colors. Prior art strategies of simply increasing color density are found to actually cause a color to lose its chromaticity, and due to a smaller gamut, are found to require the use of a thicker film, which may lead to drying issues and higher cost.

In addition, it is surprisingly discovered that, while able to provide impressive results regarding color gamut, many prior art printing methods are unsuitable for use in the absorbent paper product industry due to the relatively low modulus of the absorbent paper product substrates. Put another way, one of skill in the art will appreciate that one cannot simply extend a printing method used for a high modulus substrate (i.e., card stock or newspaper) for a low modulus substrate. Further, prior to the present invention, one of ordinary skill in the art would be dissuaded from printing with additional process colors (especially, RGB—additive colors) over traditional process colors (CMYK) because it is thought that because printed colors are produced by overlaying ink pigments rather than combining different wavelengths of light, by printing red, green, and blue on top of one another, not many colors would be produced. For example, using these colors would not produce yellow. It is for this reason that CMYK (subtractive colors) are used.

Further, the low modulus of absorbent paper product substrates (i.e., the absorbent paper product itself) provides for inconsistencies in the substrate that are relatively noticeable when compared to an ordinary paper substrate (such as that for printing a book or newspaper). As a result, maintaining adequate tension in the web during printing without tearing, shredding, stretching, or deforming, the absorbent paper product substrate provides a challenge to any producer of absorbent paper products having printing thereon. Table 1 (below) shows the MD and CD modulus values at a load of about 15.0 grams:

TABLE 1

Modulus of Different Substrates at 15 g Load

| Product | MD Modulus (g/cm) | CD Modulus (g/cm) |
|---|---|---|
| Absorbent Paper Products (Paper Towels) | | |
| Bounty Basic ® (The Procter & Gamble Company) | 1195 | 1891 |
| Bounty ® (The Procter & Gamble Company) | 3227 | 2074 |
| Oasis ™ (Irving) | 1744 | 2594 |
| Kirkland ™ (Georgia Pacific) | 2025 | 9199 |
| Sam's Club ™/Member's Mark ™ (First Quality) | 1052 | 3410 |
| Kroger ™ (Potlatch) | 1653 | 3164 |
| Oasis ™ (First Quality) | 831 | 2279 |
| Sparkle ® (Georgia Pacific) | 2389 | 5143 |
| Scott ® (Kimberly Clark) | 1406 | 1469 |
| Viva ® (Kimberly Clark) | 623 | 604 |
| Ordinary Printable Substrates | | |
| Hallmark ® 2-ply Balloon Napkins (Printed Party Napkin) | 21500 | 36772 |
| Pampers ® Feel and Learn 26-count Package (Polyethylene Wrapper/Flexible Packaging) | 23382 | 25351 |
| Aug. 8, 2007 USA Today (Newspaper) | 92828 | 58987 |

In some embodiments of the present invention, the absorbent paper product is a paper towel product, such as those sold under the Bounty® trademark (The Procter and Gamble Co., Cincinnati, Ohio). As exemplified above, absorbent paper products, as contemplated by the present invention, can be distinguished from ordinary printable substrates by the MD and/or CD modulus. In some embodiments, the absorbent paper products of the present invention have a MD and/or CD modulus of less than about 20,000 g/cm at a load of about 15 g. In other embodiments, the absorbent paper products have a MD and/or CD load of from about 500 g/cm to about 20,000 g/cm at a load of about 15 g. In another embodiment, the absorbent paper products have a MD and/or CD load of from about 1000 g/cm to about 15,000 g/cm at a load of about 15 g. In another embodiment still, the absorbent paper products have a MD and/or CD load of from about 2000 g/cm to about 10,000 g/cm at a load of about 15 g. Modulus may be measured according to the Modulus Test Method described below.

Printing

As described supra, those of skill in the art will appreciate that printing on absorbent paper product substrate poses additional difficulties compared to ordinary printable substrates. Additional challenges and difficulties associated with printing on paper towel substrates are described in U.S. Pat. No. 6,993,964.

In one embodiment, central impression printing may be used to provide ink to the substrates. Exemplary central impression printing methods and apparatus are described in U.S. Pat. Nos. 6,220,156, 6,283,024, and 5,083,511. In another embodiment, in-line printing may be used to provide ink to the substrates. Exemplary in-line printing methods and apparatus are described in U.S. Pat. App. No. 2006/0170729A1 and U.S. Pat. Nos. 6,587,133, 6,026,748, and 5,331,890. Alternatively, printing may be performed using any multi-stage printing apparatus for printing on absorbent paper product substrates such as those exemplified in U.S. Pat. Nos. 5,638,752, 6,026,748, and 5,331,890. In one embodiment, the present invention may be performed on a multi-stage printing system, however, unlike prior art multi-stage printing systems, the present invention may be made using at least five, rather than four, ink/color stations to provide the image to the surface of the absorbent paper product substrate. In one embodiment, seven colors are used to provide the printed substrates of the present invention. Surprisingly, it is found that when red, green, and blue-violet inks in particular are used in conjunction with the standard CMYK process colors for a seven-color process printing procedure, the resultant absorbent paper products made with this process/apparatus exhibited a noticeably improved appearance and larger color gamut as compared to the prior art four color printing. Without wishing to be limited by theory, it is thought that the additional ink colors provide a larger resultant color palette than is possible from the prior art printing processes/apparatus.

Figure 1B:
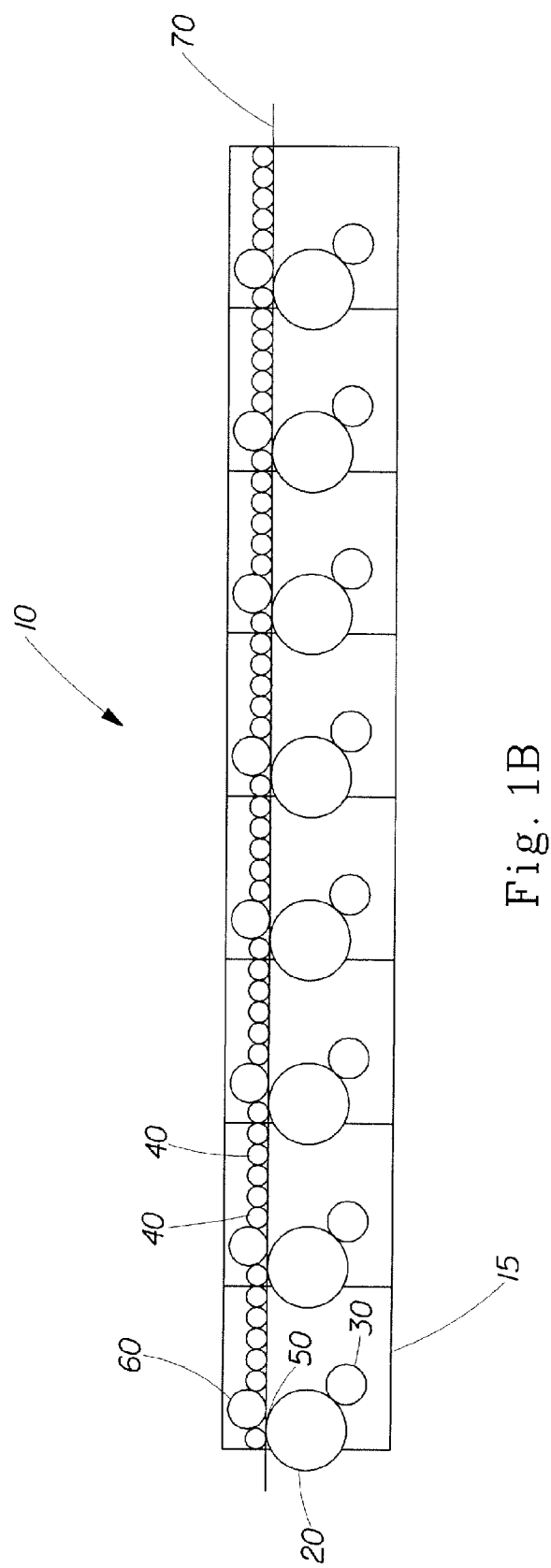
FIG. 1B shows a schematic view of an exemplary embodiment of a series of printing stations.

FIG. 1A shows an exemplary embodiment of a single printing station 15 in embodiment of a multi-stage printing station 10 (shown in FIG. 1B). In the exemplary embodiment, each printing station 15 comprises a rotary plate roll 20 which includes a printing plate. An ink transfer roll 30 provides a specific colored ink to the rotary plate roll 20. An absorbent paper product substrate 70 is passed through the printing station 15 along a plurality of guide rolls 40. Ink is provided onto the surface of the absorbent paper product substrate 70 at a nip 50 formed between the rotary plate roll 20 and an impression roll 60.

FIG. 1B shows an exemplary embodiment of a multi-stage printing station 10 comprising eight single printing stations 15. The exemplary embodiment is not intended to limit the scope of the present invention, and it should be understood that more, or fewer, printing stations may be used. At each single printing station 15, the absorbent paper product substrate 70 is received at the nip 50. In one embodiment, the impression roll 60 and the rotary plate roll 20 rotate in opposite directions (i.e., the impression roll 60 is rotating counter-clockwise and the rotary plate roll 20 is rotating clockwise) such that the absorbent paper product substrate 70 moves along the multi-stage printing station 10 from one station 15 to the next. In one embodiment, the sheet velocity between single print stations 15 is uniform.

As the absorbent paper product substrate 70 passes between the nip 50 of each single print station 15, the rotary plate roll 20 provides ink onto the surface of the absorbent paper product substrate 70. For a multi-color printing process, each single print station 15 may provide a different color ink, at a different halftone density, to the substrate 70. One of skill in the art will appreciate that the presently described apparatus is not limited to the application of inks, but any suitable surface coating may be applied to the surface. Exemplary coating compositions include, but are not limited to: aqueous solutions, dispersions, and emulsions of water dispersible or water-soluble film-forming binder materials, such as acrylic resins, hydrophilic colloids, vinyl alcohol, and the like. In many multi-color printing operations, a final clearcoat may be applied to the absorbent paper product substrate 70 at the last single print station 15. It should be understood that a non-ink surface coating may be applied at any stage in the multi-stage printing process. For example, a print enhancing fluid, such as described in U.S. Pat. No. 6,477,948 may be provided to the fibrous structure substrate prior to application of ink to the substrate.

As described supra, one embodiment of the present invention is printed using a greater number of base colors than in the prior art printing processes. In one embodiment, the base colors used are: cyan, magenta, yellow, black, red, green, and blue-violet. An eighth, and last in the sequence of final, single print station 15 provides a pigment-less overcoat to decrease the rub-off or improve print color density. Exemplary coatings are described in U.S. Pat. No. 6,096,412.

In other embodiments, to improve ink rub-off resistance, the ink composition of this invention may contain a wax. A wax suitable for this invention includes but is not limited to a polyethylene wax emulsion. Addition of a wax to the ink composition of the present invention enhances rub resistance by setting up a barrier which inhibits the physical disruption of the ink film after application of the ink to the fibrous sheet. Based on weight percent solids of the total ink composition, suitable addition ranges for the wax are from about 0.5% solids to 10% solids. An example of a suitable polyethylene wax emulsion is JONWAX 26 supplied by S.C. Johnson & Sons, Inc. of Racine, Wis. Glycerin may also be added to the ink composition used in the present invention in order to improve rub-off resistance. Based upon weight percent of the total ink composition, suitable addition ranges for the glycerin range from about 0.5% to 20%, preferably from about 3% to 15%, and more preferably from about 8% to 13%.

Figure 2:
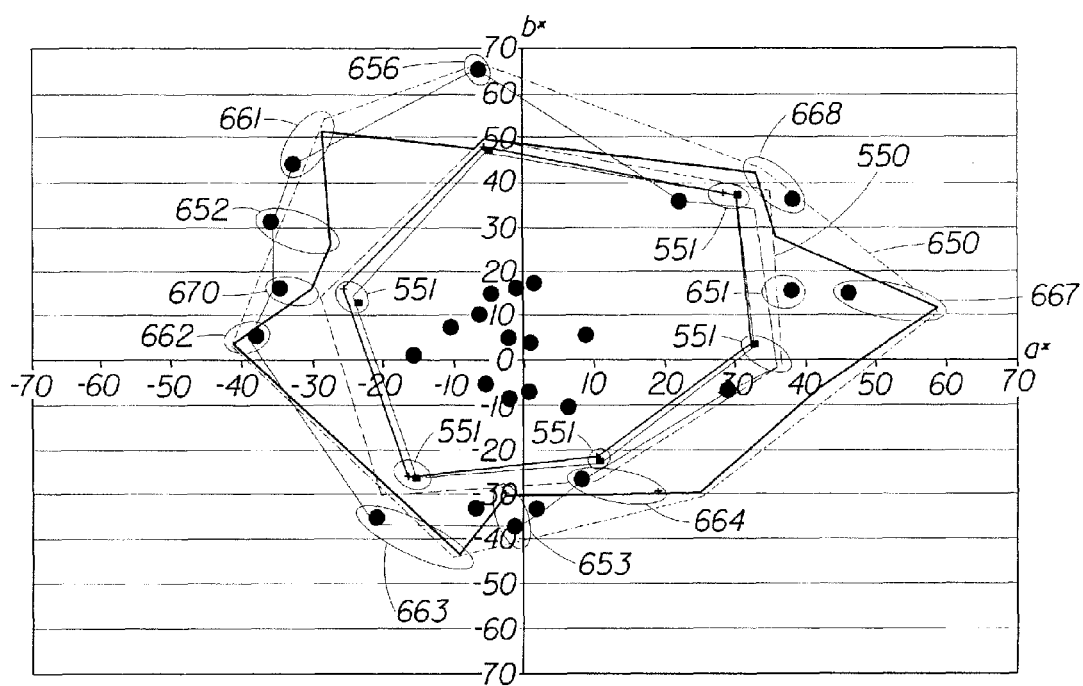
FIG. 2 shows a graphical representation of exemplary extrapolated 4-color and 7-color gamuts.

FIG. 2 shows an exemplary extrapolated graphical representation of the color gamut available to the prior art absorbent paper product substrates in an L*a*b color space in the a*-b* plane. The L*a*b* points are chosen according to the Color Test Method described below. Without wishing to be limited by theory, it is thought that the most "intense" (i.e., 100% halftone) colors represent the outer boundaries of the color gamut. Surprisingly, it was found that the four color gamut 550 does not occupy as large of a volume as the seven color gamut 650 of the present invention absorbent paper product. In one embodiment, the seven color gamut uses red 651, green 652, blue-violet 653, magenta 654, cyan 655, yellow 656, and black as the process colors at color densities from 0.55 to 0.85. More surprisingly, the combination of the red, green, and blue-violet colors with the prior art cyan, magenta, yellow, and black (green+yellow 661, cyan+green 662, cyan+blue-violet 663, cyan+magenta 664, magenta+ blue-violet 665, magenta+red 667, yellow+red 668, magenta+yellow 669, blue-violet+yellow 670, yellow+cyan 671, and cyan+red 672) provided resultant colors that extended beyond the limitations of the red, green, and blue-violet process colors and well beyond the prior art colors 551, and color combinations, when described in L*a*b* space. Specifically, the additional ink colors (in the exemplary embodiment, red, green, and blue-violet) provide about a 40% increased color palette over the palette of the prior art absorbent paper products.

As described supra, it is observed that a product with an increased color gamut compared to another product there are more visually perceptible colors in the present invention absorbent paper products compared to present invention absorbent paper products printed using only four process colors. It is surprisingly noticed that the present invention also provides products having a full color scale with no loss in gamut. In addition FIG. 2 shows that prior art samples 570 were measured and the colors on the surface of the absorbent paper product clearly fell within the four color gamut 550.

The prior art samples measured to record data points are Brawny™ (Georgia Pacific), Sparkle™ (Georgia Pacific), Scott (Kimberly Clark), Viva (Kimberly Clark), Homebest™ Awesome, and Kroger™ Nice-N-Strong. Products of the present invention 670 clearly exhibit perceived colors that are outside of the color gamut of the prior art, in addition to perceived colors within the color gamut of the prior art.

The four color gamut 550 and seven color gamut 650 boundaries may be approximated by the following system of equations, respectively:

Prior Art (4-Color Printing on Paper Towel Products)

$$\{a^*=-29.0 \text{ to } -5.2; b^*=14.0 \text{ to } 49.5\} \rightarrow b^*=1.4916a^*+57.2563$$

$$\{a^*=-5.2 \text{ to } 35.3; b^*=49.5 \text{ to } 38.9\} \rightarrow b^*=-0.261728a^*+48.139$$

$$\{a^*=35.3 \text{ to } 38.3; b^*=5.3 \text{ to } 38.9\} \rightarrow b^*=-11.2a^*+434.26$$

$$\{a^*=38.3 \text{ to } 36.3; b^*=5.3 \text{ to } -0.70\} \rightarrow \!\!> b^*=3a^*-109.6$$

$$\{a^*=36.3 \text{ to } 11.3; b^*=-0.70 \text{ to } -26.0\} \rightarrow b^*=1.012a^*-37.4356$$

$$\{a^*=11.3 \text{ to } -20.0; b^*=-26.0 \text{ to } -29.3\} \rightarrow b^*=0.105431a^*-27.1914$$

$$\{a^*=-20.0 \text{ to } -29.0; b^*=-29.3 \text{ to } 14.0\} \rightarrow b^*=-4.81111a^*-125.522$$

wherein L* is from 0 to 100.

Present Invention (7-Color Printing on Paper Towel Products)

$$\{a^*=-41.2 \text{ to } -29.0; b^*=3.6 \text{ to } 52.4\} \rightarrow b^*=4a^*+168.4$$

$$\{a^*=-29 \text{ to } -6.4; b^*=52.4 \text{ to } 64.9\} \rightarrow b^*=-0.553097a^*+68.4398$$

$$\{a^*=-6.4 \text{ to } 33.4; b^*=64.9 \text{ to } 42.8\} \rightarrow b^*=-0.553097a^*+61.3462$$

$$\{a^*=33.4 \text{ to } 58.0; b^*=42.8 \text{ to } -12.5\} \rightarrow \!\!> b^*=-1.23171a^*+83.939$$

$$\{a^*=58.0 \text{ to } 25.8; b^*=12.5 \text{ to } -28.2\} \rightarrow b^*=1.26398a^*-68.8106$$

$$\{a^*=25.8 \text{ to } -9.6; b^*=-28.2 \text{ to } -43.4\} \rightarrow b^*=0.429379a^*-39.278$$

$$\{a^*=-9.6 \text{ to } -41.2; b^*=-43.4 \text{ to } 3.6\} \rightarrow b^*=-1.48734a^*-57.6785$$

wherein L* is from 0 to 100.

The above-described gamuts are approximated by drawing straight lines to between the outermost points of the 4-color and 7-color gamuts (550, 560, respectively in FIG. 2). The 4-color gamut 550 of the prior art absorbent paper products occupies a smaller L*a*b* color space than the present invention products' 7-color gamut 560. In one embodiment, the present invention comprises a paper towel product comprising colors which may be described in the a*-b* axes of the L*a*b color space extending beyond the area enclosed by the system of equations describing the 4-color gamut. In another embodiment, the present invention comprises a paper towel product comprising colors which may be described in the a*-b* axes of the L*a*b color space extending beyond the area enclosed by the system of equations describing the 4-color gamut 550, but enclosed by the system of equations describing the 7-color gamut 560.

Basis Weight Method

Basis weight is measured by preparing one or more samples of a certain area ($m^2$) and weighing the sample(s) of a fibrous structure according to the present invention and/or a fibrous structure product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples ($m^2$). The basis weight ($g/m^2$) is calculated by dividing the average weight (g) by the average area of the samples ($m^2$). This method is herein referred to as the Basis Weight Method.

Tensile Modulus Test

Tensile Modulus of tissue samples may be obtained at the same time as the tensile strength of the sample is determined. In this method a single ply 10.16 cm wide sample is placed in a tensile tester (Thwing Albert QCII interfaced to an LMS data system) with a gauge length of 5.08 cm. The sample is elongated at a rate of 2.54 cm/minute. The sample elongation is recorded when the load reaches 10 g/cm ($F_{10}$), 15 g/cm ($F_{15}$), and 20 g/cm ($F_{20}$). A tangent slope is then calculated with the mid-point being the elongation at 15 g/cm ($F_{15}$).

Total Tensile Modulus is obtained by measuring the Tensile Modulus in the machine direction at 15 g/cm and cross machine direction at 15 g/cm and then calculating the geometric mean. Mathematically, this is the square root of the product of the machine direction Tensile Modulus (TenMod15MD) and the cross direction Tensile Modulus (TenMod15CD).

$$\text{Total Tensile Modulus} = (\text{TenMod15MD} \times \text{TenMod15CD})^{1/2}$$

One of skill in the art will appreciate that relatively high values for Total Tensile Modulus indicate that the sample is stiff and rigid.

Color Test Method

For the purposes of measuring color in the present invention and prior art samples, spectral data is measured at D50 12°.

Scanning the Color Standard

An IT8 color standard for scanners (Eastman Kodak Company, Rochester, N.Y.) is placed printed side down, facing the scanner light of the scanning surface of a Scanmaker 9800 XL scanner (Microtek, Carson, Calif.) attached to any compatible computer system. The 9800 XL Scanner is run with neutral scan settings, and with color management, black-and-white points, and tonal adjustment turned off. The scanned image is acquired in the Adobe Photoshop CS2 (Adobe, San Jose, Calif.) and saved as a *.tif file. The *.tif file is opened in the Profile Maker Measure Tool Program (Gretag Macbeth/X-rite, Grand Rapids, Mich.) software program. In Profile Maker, the RGB data collected from the scanner may be correlated to known L*a*b* data (which is known from the IT8 standard) to provide a standard ICC profile.

Measuring Printed Paper Towel Products

Color-containing surfaces are tested in a dry state and at a standard air temperature and pressure. The sample paper towel product to be measured is inspected visually at about a 20× magnification. At this magnification, the individual process colors used may be distinguished from the halftone colors that are observed when the product is not magnified. The areas on the paper towel product having the largest areas of individual (i.e., pure) process colors are noted.

Measuring Printed Paper Towel Products: Prior Art Color Process Printed Product

The sample paper towel product is placed printed side down, facing the scanner light of the scanning surface of a Scanmaker 9800 XL Scanner (Microtek, Carson, Calif.) attached to any compatible computer system. The 9800 XL Scanner is run with neutral scan settings, and color management, black-and-white points, and tonal adjustment turned off. The scanned image is imported into Photoshop CS2 (Adobe, San Jose, Calif.) and saved as a *.tif file. The *.tif file is opened in the Profilemaker software program and the collected RGB data may be used to provide corresponding L*a*b* data using the standard scanner ICC profile (described supra from the IT8 standard).

Acquiring Standard Spectral Data/7 Color Outer Limits

Samples of standard product substrate having 1"×1" printed squares of known maximized (i.e., 100% process print) CMYK and RGB colors are measured with an Eye-One Pro Spectrophotometer that is attached to a suitable computer system with the Profile Maker Measure Tool Program. Within the Profile Maker Measure Tool Program, choose "configure device", "Eye-One Pro Spectrophotometer", "reflective", and "spectral data". The Eye-One Spectrophotometer measures the squares. This provides the spectral curves and L*a*b* data for the CMYK process colors.

Extrapolating Spectral Data for Measured Products

One of skill in the art will appreciate that spectral data may be converted to L*a*b* data. One of skill in the art will also appreciate that for the CMYK colors measured from a sample standard product (L*a*b* data measured) the spectral data may be extrapolated using known mathematical relationships and an iterative method to relate spectral data to CMYK L*a*b* values based on the known CMYK L*a*b* values measured from 1"×1" CMYK squares of the sample standard product. Thus, one of skill in the art may extrapolate the CMYK spectra for any measured product.

Extrapolating RGB L*a*b* Outer Limits: 4-Color Process Printed Product Since CMYK process color combinations are used to provide red, green, and blue-violet, the L*a*b* values for red, green, and blue-violet must be extrapolated for 4-color process printed products. One of skill in the art will appreciate that the following process color combinations are used to provide red, green, and blue-violet: C+Y (green); M+Y (red); C+M (blue-violet).

The known spectral data from the sample standard product is imported into the Profile Maker software program to create a base for extrapolating color combination L*a*b* data. The GoP function is used in Profile Maker in combination with the extrapolated CMYK spectral data for a measured product to provide extrapolated L*a*b* data for C+Y (green); M+Y (red); C+M (blue-violet).

The actual values for the RGB and CMYK L*a*b* 7-color process printed product is plotted versus the CMYK and C+Y (green); M+Y (red); C+M (blue-violet) 4-color process printed product.

All measurements referred to herein are made at 23+/−1° C. and 50% relative humidity, unless otherwise specified.

All publications, patent applications, and issued patents mentioned herein are hereby incorporated in their entirety by reference. Citation of any reference is not an admission regarding any determination as to its availability as prior art to the claimed invention.

The dimensions and values disclosed herein are not to be understood as being strictly limited to the exact numerical values recited. Instead, unless otherwise specified, each dimension and/or value is intended to mean both the recited dimension and/or value and a functionally equivalent range surrounding that dimension and/or value. For example, a dimension disclosed as "40 mm" is intended to mean "about 40 mm"

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An absorbent product having an MD modulus of less than about 20,000 g/cm at a load of about 15 g and further comprising indicia provided by five or more process colors, the process colors comprising L*a*b* color values wherein the a* and b* values are outside the boundary described by the following system of equations:

$$\{a^*=-29.0 \text{ to } -5.2; b^*=14.0 \text{ to } 49.5\} \rightarrow b^*=1.4916a^*+57.2563$$

$$\{a^*=-5.2 \text{ to } 35.3; b^*=49.5 \text{ to } 38.9\} \rightarrow b^*=-0.261728a^*+48.139$$

$$\{a^*=35.3 \text{ to } 38.3; b^*=5.3 \text{ to } 38.9\} \rightarrow b^*=-11.2a^*+434.26$$

$$\{a^*=38.3 \text{ to } 36.3; b^*=5.3 \text{ to } -0.70\} \rightarrow b^*=3a^*-109.6$$

$$\{a^*=36.3 \text{ to } 11.3; b^*=-0.70 \text{ to } -26.0\} \rightarrow b^*=1.012a^*-37.4356$$

$$\{a^*=11.3 \text{ to } -20.0; b^*=-26.0 \text{ to } -29.3\} \rightarrow b^*=0.105431a^*-27.1914$$

$$\{a^*=-20.0 \text{ to } -29.0; b^*=-29.3 \text{ to } 14.0\} \rightarrow b^*=-4.81111a^*-125.522$$

wherein L* is from 0 to 100.

2. An absorbent product of claim 1 wherein the process colors are inside the boundary described by the following system of equations:

$$\{a^*=-41.2 \text{ to } -29.0; b^*=3.6 \text{ to } 52.4\} \rightarrow b^*=4a^*+168.4$$

$$\{a^*=-29 \text{ to } -6.4; b^*=52.4 \text{ to } 64.9\} \rightarrow b^*=-0.553097a^*+68.4398$$

$$\{a^*=-6.4 \text{ to } 33.4; b^*=64.9 \text{ to } 42.8\} \rightarrow b^*=-0.553097a^*+61.3462$$

$$\{a^*=33.4 \text{ to } 58.0; b^*=42.8 \text{ to } -12.5\} \rightarrow b^*=-1.23171a^*+83.939$$

$$\{a^*=58.0 \text{ to } 25.8; b^*=12.5 \text{ to } -28.2\} \rightarrow b^*=1.26398a^*-68.8106$$

$$\{a^*=25.8 \text{ to } -9.6; b^*=-28.2 \text{ to } -43.4\} \rightarrow b^*=0.429379a^*-39.278$$

$$\{a^*=-9.6 \text{ to } -41.2; b^*=-43.4 \text{ to } 3.6\} \rightarrow b^*=-1.48734a^*-57.6785$$

wherein L* is from 0 to 100.

3. The absorbent product of claim 2 wherein the five or more process colors are selected from the group consisting of: cyan, yellow, magenta, black, red, green, blue-violet, and combinations thereof.

4. The absorbent product of claim 1 wherein the MD modulus ranges from about 500 g/cm to about 20,000 g/cm at a load of about 15 g.

5. The absorbent product of claim 4 wherein the MD modulus ranges from about 1000 g/cm to about 15,000 g/cm at a load of about 15 g.

6. The absorbent product of claim 5 wherein the MD modulus ranges from about 2000 g/cm to about 10,000 g/cm at a load of about 15 g.

7. The absorbent product of claim 1 wherein the process colors are cyan, yellow, magenta, black, red, green, blue-violet, and combinations thereof.

8. The absorbent product of claim 1 wherein the absorbent product further comprises an anti-rub off coating.

9. The absorbent product of claim 1 wherein the indicia are provided by a plurality of halftone dots.

10. The absorbent product of claim 1 wherein the absorbent product is a fibrous structure.

11. The absorbent product of claim 10 wherein said fibrous structure comprises a single ply.

12. The absorbent product of claim 11 wherein said fibrous structure comprises at least two plies.

13. The absorbent product of claim 1 wherein the absorbent product is an absorbent paper product.

14. The absorbent product of claim 13 wherein the absorbent product comprises at least one ply.

* * * * *